(12) United States Patent
Van Riel et al.

(10) Patent No.: US 6,901,333 B2
(45) Date of Patent: May 31, 2005

(54) METHOD AND DEVICE FOR THE GENERATION AND APPLICATION OF ANISOTROPIC ELASTIC PARAMETERS

(75) Inventors: Paul Van Riel, Rotterdam (NL); Hendrik Willem Johan Debeye, The Hague (NL)

(73) Assignee: Fugro N.V., Leidschendam (NL)

(*) Notice: Subject to any disclaimer, the term of this patent is extended or adjusted under 35 U.S.C. 154(b) by 43 days.

(21) Appl. No.: 10/694,621

(22) Filed: Oct. 27, 2003

(65) Prior Publication Data

US 2005/0090986 A1 Apr. 28, 2005

(51) Int. Cl.$^7$ ................................................. G01V 1/28
(52) U.S. Cl. ....................................................... 702/18
(58) Field of Search ............................ 702/18, 16, 14, 702/13, 12, 11, 7, 6; 703/10, 5, 2; 367/73

(56) References Cited

U.S. PATENT DOCUMENTS

| | | | | |
|---|---|---|---|---|
| 5,648,939 A | * | 7/1997 | Folstad et al. ................. | 702/14 |
| 5,677,893 A | * | 10/1997 | de Hoop et al. ............... | 702/14 |
| 5,737,220 A | * | 4/1998 | Miller .......................... | 702/14 |
| 6,094,400 A | * | 7/2000 | Ikelle .......................... | 367/75 |
| 6,618,678 B1 | | 9/2003 | Van Riel | |
| 6,665,615 B2 | | 12/2003 | Van Riel et al. | |
| 6,714,873 B2 | * | 3/2004 | Bakulin et al. ................ | 702/14 |
| 6,715,551 B2 | * | 4/2004 | Curtis et al. ............ | 166/250.16 |

OTHER PUBLICATIONS

John P. Castagna and Milo M. Backus; "Offset–Dependent Reflectivity—Theory and Practice of AVO Analysis"; Investigations in Geophysics No. 8; pp. 1–36; Society of Exploration Geophysicists, AVO Analysis–Tutorial and Review.

Patrick Connolly; "Elastic Impedance"; The Leading Edge; Apr., 1999; pp. 438, 440, 442, 444, 446, 448, 450, 452.

Irshad R. Mufti and Ricardo A.R. Fernandes; "A wave-equation splitting algorithm for seismic modeling with applications to anisotropic media", 1998 SEG Expanded Abstracts (4 pgs.).

Arild Buland and Henning Omre; "D–39 Bayesian Seismic Inversion and Estimation in a Spatial Setting", EAGE 65$^{th}$ Conference & Exhibition–Stavanger, Norway, Jun. 2–5, 2003 (pp. 1–4).

Arild Buland and Henning Omre; "Bayesian linearized AVO Inversion"; GEOPHYSICS, vol. 68, No. 1 (Jan.–Feb. 2003); pp. 185–198; 16 Figs., 3 Tables.

Jan L. Fatti, et al; "Detection of gas in sandstone reservoirs using AVO analysis: A 3–D seismic case history using the Geostack technique"; GEOPHYSICS, vol. 59, No. 9 (Sep. 1994): pp. 1362–1376, 16 Figs., 1 Table.

Bill Goodway, et al.; "Improved AVO fluid detection and lithology discrimination using Lamé petrophysical parameters: "$\lambda\rho$", "$\mu\rho$", & "$\lambda/\mu$ fluid stack", from P and S inversions"; Canadian Society of Exploration Geophysicists 1998 Annual Meeting Expanded Abstracts, AVO 2.7, pp. 183–186.

(Continued)

Primary Examiner—Donald McElheny, Jr.
(74) Attorney, Agent, or Firm—The Webb Law Firm

(57) ABSTRACT

A method is disclosed for the generation and application of anisotropic elastic parameters. Anisotropic elastic parameters are generated such that, for selected seismic wave and anisotropy types, an approximation to the anisotropic modeling of seismic amplitudes is obtained by the equivalent isotropic modeling with the anisotropic elastic parameters. In seismic modeling, wavelet estimation, seismic interpretation, inversion and the interpretation and analysis of inversion results anisotropy are handled with isotropic methods, when earth elastic parameters utilized in these methods are replaced by the anisotropic elastic parameters.

45 Claims, 8 Drawing Sheets

OTHER PUBLICATIONS

Klaus Bolding Rasmussen, et al.; "Rock Properties Prediction Through AVO Seismic Inversion"; NPF Geophysical Biennial Geophysical Seminar Expanded Abstracts; pp. 107–110.

H. Rutledal, et al.; "Time–Lapse Elastic Inversion as the Oseberg Field"; EAGE 64$^{th}$ Conference & Exhibition–Florence, Italy; May 27–30, 2002; pp. 1–4.

G.C. Smith and P.M. Gidlow; "Weighted Stacking for Rock Property Estimation and Detection of Gas"; Geophysical Prospecting 35; 1987; pp. 993–1014.

T. Tonellot, et al.; "3D quantitative AVA:Joint versus sequential stratigraphic inversion of angle–limited stacks"; SEG Int'l Exposition and 72$^{nd}$ Annual Meeting, Salt Lake City, Utah, Oct. 6–11, 2002; (4 pgs.).

David N. Whitcombe, et al.; "Extended elastic impedance for fluid and lithology prediction"; SEG 2000Expanded Abstracts; (4 pgs.).

A.T. Walden and R.E. White; "On Errors of Fit and Accuracy in Matching Synthetic Seismograms and Seismic Traces", Geophysical Prospecting 32, 1984; pp. 871–891.

Roy White and Rob Simm; "Tutorial: Good practice in well ties", © 2003 EAGE; First Break vol. 21, Oct. 2003; pp. 75–83.

Charles Bertrand, et al.; "Seismic facies analysis applied to P and S impedances from pre–stack inversion"; SEG Int'l Exposition and 72$^{nd}$ Annual Meeting Expanded Abstracts, Salt Lake City, Utah, Oct. 6–11, 2002; (4 pgs.).

Alistair R. Brown; "Tuning Phenomena in Reservoirs" Interpretation of Three–Dimensional Seismic Data; AAPG Memoir 42, American Association of Petroleum Geologists, Fourth Edition, Chapter Six; pp. 179–190.

Steve Lancaster and David Whitcombe; "Fast–track 'coloured' inversion"; SEG 2000 Expanded Abstracts; (4 pgs.).

Andreas Rüger; "Reflection Coefficients and Azimuthal AVO Analysis in Anisotropic Media"; SEG No. 10; Geophysical monograph series; Published 2002; United States of America; pp. cover page, i–xi, 1–189.

Leon Thomsen; Understanding Seismic Anisotropy in Exploration and Exploitation; 2002 Distinguished Instructor Short Course, Distinguished Instructor Series, No. 5; Sponsored by the Society of Exploration Geophysicists European Association of Geoscientists & Engineers; (165 pgs.).

* cited by examiner

METHOD AND DEVICE FOR THE GENERATION AND APPLICATION OF ANISOTROPIC ELASTIC PARAMETERS

BACKGROUND OF THE INVENTION

1. Field of the Invention

The present invention relates generally to a method of seismic data modeling and the interpretation and estimating of earth parameters from seismic data. More particularly, the present invention relates to a method of incorporating and accounting for the effects of anisotropy in seismic applications.

2. Description of the Related Art

Seismic data acquisition involves the generation of seismic waves in the earth using an appropriate source or sources and the recording of the response of the earth to the source waves. Seismic data is routinely acquired to obtain information about subsurface structure, stratigraphy, lithology and fluids contained in the earth's rocks. The seismic response is in part generated by the reflection of seismic waves in the subsurface where there are changes in those earth properties that impact seismic wave propagation. The process that describes how source signals propagate and how the response is formed is termed seismic wave propagation.

Modeling is used to gain understanding of seismic wave propagation and to help analyze seismic signals. In modeling, a model of earth properties is posed and a seismic wave propagation modeling algorithm is used to synthesize seismic responses. For purposes of the present invention, modeling is assumed to include the synthesis of the amplitudes of reflected seismic waves. Models of earth properties are often specified in terms of physical parameters. An example is the group of modeling methods that today are widely used to study changes in seismic reflection amplitudes with changing angle of incidence of a plane wave reflecting from a flat interface. See Castagna, J. P. and Backus, M. M., "Offset-dependent reflectivity—theory and practice of AVO analysis", 1993, Investigations in Geophysics vol. 8, Society of Exploration Geophysicists, chapter I. In this model, the two half-spaces above and below the interface are assumed to be homogeneous and isotropic so that each half-space can be described with just three earth parameters, for example p-wave velocity, s-wave velocity and density. In practice alternative triplets of parameters may be used, for example p-wave impedance, s-wave impedance and density. These parameters are referred to as elastic parameters. In some cases, modeling methods start from other earth parameters, and the transforms to elastic parameters are included as part of the modeling method.

Many alternative modeling methods are described in the literature to tackle more complex models. One well-known extension to the above single interface model is to a stack of horizontal layers rather than just two and with incorporation of waves generated from a point source instead of plane waves. Another example involves the use of elastic impedance, as described by Connolly, P., 1999, "Elastic impedance", The Leading Edge, April 1999, pp. 438–452. For more general cases a wide range of computational algorithms is available, often based on the use of finite difference schemes, as for example discussed by Mufti, I. R., and Fernandes, R. A. R., 1998, "A wave-equation splitting algorithm for seismic modeling with applications to anisotropic seismic media", Society of Exploration Geophysicists 68th Annual Meeting Expanded Abstracts.

In seismic modeling methods seismic responses are synthesized given the earth parameters. Often this involves expressing changes in the elastic parameters across interfaces in terms of their relative contrasts. In the following, the term elastic parameter is deemed to also include relative elastic parameter contrasts. Seismic modeling is often referred to as forward modeling. The reverse process of forward modeling is called inverse modeling or inversion. The goal of inversion is to estimate earth parameters given the measured seismic responses. Many inversion methods are available. They all have in common that they are based on some forward model of seismic wave propagation. Buland, A., and Omre, H., 2003, "Bayesian Seismic Inversion and Estimation in a Spatial Setting", European Association of Geoscientists and Engineers 65th Annual Conference Expanded Abstracts; Buland, A., and Omre, H., 2003, "Bayesian linearized AVO inversion", Geophysics, volume 68, pp. 185–198; Fatti, J. L., Smith, G. C., Vail, P. J., Strauss, P. J., and Levitt, P. R., 1994, "Detection of gas in sandstone reservoirs using AVO analysis: A 3D seismic case history using the Geostack technique", Geophysics, volume 59, pp. 1362–1376; Goodway, B., Chen, T., and Downton J., 1998, "Improved AVO fluid detection and lithology discrimination using Lamépetrophysical parameters; "$\lambda\rho$", "$\mu\rho$", & "$\lambda/\mu$ fluid stack', from P and S inversions", Canadian Society of Exploration Geophysicists 1998 Annual Meeting Expanded Abstracts; Rasmussen, K. B., Veggeland, T., Espersen, T. B., Pedersen, J. M., and Maver, K. G., 2000, "Rock Properties Prediction Through AVO Seismic Inversion", NPF Geophysical Biennial Geophysical Seminar Expanded Abstracts; Rutledal, H., Elde, R., Van Wijngaarden, A-J., Helgesen, J., Buran, H., and Weisser, T., 2002, "Time-lapse elastic inversion at the Oseberg field", European Association of Geoscientists and Engineers 64th Annual Conference Expanded Abstracts; Smith, G. C., and Gidlow, P. M., 1987, "Weighted stacking for rock property estimation and detection of gas", Geophysical Prospecting, volume 35, pp. 993–1014; Tonellot, T., Mace, D., and Richard, V., 2002, "3D quantitative AVA: Joint versus sequential stratigraphic inversion of angle-limited stacks", Society of Exploration Geophysicists 72nd Annual Meeting Expanded Abstracts; Whitcombe, D. N., Connolly, P. A., Reagan, R. I., and Redshaw, T. C., 2000, "Extended elastic impedance for fluid and lithology prediction", Society of Exploration Geophysicists 70th Annual Meeting Expanded Abstracts; and U.S. patent application Ser. No. 09/817,807 present examples of inversion methods that use the amplitudes of seismic data to estimate subsurface elastic parameters. Some of these methods make use of certain input elastic parameter data, for example in the form of low frequency trend information or statistical distributions. Other inversion methods do not use elastic parameters upon input, and use some calibration of seismic amplitudes, performed in a pre-processing step or as part of the algorithm. Alternatively, amplitude calibration is done in a post-processing step. Mostly inversion methods operate on an output elastic parameter data. However, some methods may work with other earth parameter data, where the transforms to elastic parameter data are incorporated into the method. Dependent on the seismic data acquisition geometries, estimates of earth rock properties obtained from any of these inversion methods are generally provided as a series of 2D sections or 3D volumes of elastic parameters.

An important component of modeling and inversion is the seismic wavelet. Many methods are available for wavelet estimation. It is generally advantageous to use available bore hole data or modeling results based on bore hole data in estimating wavelets, see e.g., Walden, A. T., and White, R.

E., 1984, "On errors of fit and accuracy in matching synthetic seismograms and seismic traces", Geophysical Prospecting, volume 32, pp. 871–891; and White, R., and Simm, R., Oct. 2003, "tutorial: Good practice in well ties", First Break, volume 21, pp. 75–83. Alternatively, the amplitude and phase characteristics of wavelets initially obtained without making use of bore hole data are often refined or calibrated by making use of bore hole data or modeling results based on bore hole data.

Inversion is generally followed by a step of analysis and interpretation of the inversion results. Available bore hole log measurements are used to support the analysis and interpretation. To facilitate the comparison, it is desirable that the bore hole log data and the inversion results are matched. This may require transforms of the bore hole log data to the elastic parameters output with the inversion. Alternatively, the inversion results are transformed. When bore hole data and inversion results are available that are properly matched, interpretation can be highly automated, see for example U.S. patent application Ser. No. 09/579,695; and Bertrand, C., Tonellot, T., and Fournier, F., 2002, "Seismic facies analysis applied to P and S impedances from pre-stack inversion", Society of Exploration Geophysicists 72$^{nd}$ Annual Meeting Expanded Abstracts. When bore hole data is not available, data from other bore holes that have comparable characteristics, model data or hypothetical data may be used. Also in these cases transforms may be advantageous to support matching between these data and the inversion results.

Conventional interpretation is done on the seismic data. To help understand the amplitude characteristics of the seismic data, seismic modeling is often performed using available bore hole data or data from analogues or hypothetical data. One example of incorporating seismic amplitude modeling results in seismic interpretation is described by Brown, A. R., 1996, "Interpretation of three-dimensional seismic data", AAPG Memoir 42, American Association of Petroleum Geologists, chapter 6. Further, bore hole or model elastic parameter data is routinely visualized in conjunction with seismic data in support of the interpretation process.

Seismic data is bandlimited in nature. Therefore, in many modeling algorithms bandlimited seismic data can be conveniently synthesized by using de-trended or bandlimited earth elastic parameters in the input earth model or earth parameters from which the elastic parameters are derived as part of the modeling method. As already noted above, reference to earth parameters or elastic parameters is deemed to encompass relative contrasts in any such parameters also. Like modeling, inversion can be used to obtain bandlimited output earth parameters, as for example presented in Lancaster, S., and Whitcombe, D. N., 2000, "Fast-track 'coloured' inversion", Society of Exploration Geophysicists 70$^{th}$ Annual Meeting Expanded Abstracts, and the analysis and interpretation step can be executed on bandlimited inversion results. Yet another alternative is provided by methods that output results in which the high frequency information (relative to the seismic bandwidth) is removed or suppressed. It is expressly noted that reference to any earth parameter includes bandlimited or de-trended earth parameters or earth parameters in which the high frequency information is removed or suppressed. It is further noted that reference to modeling, inversion, wavelet estimation and result analysis and interpretation methods encompasses methods that work on or output any such earth parameter data.

Most of today's routinely applied methods for forward modeling, wavelet estimation, inversion, analysis and interpretation of inversion results, and analysis and interpretation of seismic data have as a core assumption that the earth can be locally modeled by a stack of layers, wherein each layer is isotropic. Such methods are further referred to as "isotropic" methods. In actual fact, the earth subsurface is generally anisotropic and seismic data contains the effects of anisotropy. To distinguish such seismic data, it is termed anisotropic seismic data. The earth parameters that describe anisotropy are referred to as anisotropy parameters. To improve the accuracy of seismic modeling, wavelet estimation, inversion, and the analysis and interpretation of inversion results and seismic data in case of anisotropic seismic data requires that anisotropy is accounted for. Examples of methods to handle anisotropy are described by Rueger, A., 2002, "Reflection Coefficients and Azimuthal AVO Analysis in Anisotropic Media", geophysical monograph series No. 10, Society of Exploration Geophysicists; and Thomsen, L., 2002, "Understanding Seismic Anisotropy in Exploration and Exploitation", Distinguished Instructor Series No. 5, Society of Exploration Geophysicists/ European Association of Geoscientists and Engineers.

Incorporation of the anisotropy parameters in these methods makes them mathematically and numerically more complex than the equivalent isotropic methods. Also methods where seismic modeling is used, such as in wavelet estimation and in certain seismic data analysis and interpretation methods, would need to be extended to incorporate the anisotropy parameters, making them more complex in utilization. Further, from the perspective of inversion, explicit incorporation of anisotropy parameters is even more disadvantageous. Already inversion for the elastic parameters from AVO seismic data is recognized to be a difficult problem for most seismic data acquisition geometries. Including the anisotropy parameters in inversion as parameters that also need to be recovered in the inversion process further increases the number of unknowns and makes the inverse problem more difficult. Addition of more parameters and coping with the difficulty also complicates the analysis and interpretation of inversion results.

Thus a need exists for a method of incorporating and generating anisotropy parameters in applications such as seismic modeling, wavelet estimation, inversion and the like, as well as analysis and interpretations of such data.

SUMMARY OF THE INVENTION

Seismic anisotropy can have a strong effect on seismic amplitudes. Seismic methods that rely on seismic amplitudes should therefore preferably take into account the effect of anisotropy. This in particular is the case for use of seismic data that contains amplitude information as a function of the offset between sources and receivers, referred to as AVO (Amplitude Versus Offset) data The present invention is directed to a method for transforming earth elastic parameters, in particular, anisotropic elastic parameters, to new earth parameters and their utilization in such applications as seismic modeling, wavelet estimation, inversion and analysis and interpretation of inversion results and seismic data. A feature of the method is that, for a given forward modeling method, the forward modeling of seismic amplitudes with the new parameters adequately approximates the equivalent modeling wherein anisotropy is properly taken into account. Hence, available isotropic methods and algorithms for seismic modeling, wavelet estimation, inversion and analysis and interpretation of inversion results and seismic data, examples of which are described above, can be applied to anisotropic seismic data by appropriately substituting the transformed elastic parameters for the elastic parameters. The transformed elastic parameters are referred to as anisotropic elastic parameters.

In further detail, transforms are applied to elastic parameters and anisotropy parameters of earth data objects of interest, including bore hole or 1-D, 2-D or 3-D (trace, section or volume) data to obtain anisotropic elastic parameters. These transforms are such that, for given wave and anisotropy types, anisotropic modeling is approximated by the equivalent isotropic modeling with the anisotropic elastic parameters.

The transforms to convert the input elastic and anisotropy parameters can be derived analytically for certain so called 3-term anisotropy modeling methods. Alternatively, general transforms are proposed, where the transform parameters are determined in an iterative procedure. With these approaches transforms are derived that operate on a point-by-point basis.

Contrast expressions for the anisotropic elastic parameters can also be obtained. These can then be integrated to obtain the anisotropic elastic parameters. This procedure can lead to drift in the low frequency component and requires determination of an integration constant. Therefore, another embodiment of the present invention to obtain anisotropic elastic methods includes a method whereby the low frequency part of the anisotropic elastic parameter data obtained by integration is replaced by the equivalent part of the anisotropic elastic parameter data obtained by means of the corresponding point-by-point transforms. The transform functions can incorporate laterally and vertically varying trends in the transform variables to take into account laterally and vertically varying trends in earth properties.

With the present invention, methods and algorithms for isotropic forward modeling of anisotropic seismic amplitudes with the anisotropic elastic parameters can be used to replace modeling that accounts for anisotropy by explicitly incorporating anisotropy parameters. In seismic inversion, forward modeling is applied iteratively. Hence, where appropriate, isotropic inversion methods and algorithms that invert for seismic amplitudes can be applied for the inversion of anisotropic seismic data by replacing the elastic parameters with the anisotropic elastic parameters. The inversion results can be analyzed and interpreted with methods and algorithms designed for elastic parameters by substituting the anisotropic elastic parameters for the elastic parameters. Also, isotropic methods and algorithms for wavelet estimation can be applied to anisotropic seismic data by replacing the elastic parameters by the corresponding anisotropic elastic parameters. Several methods and algorithms for the analysis and interpretation of seismic amplitude data use synthesized seismic data or visualize elastic parameter bore hole or earth model data in support of the analysis and interpretation process. These methods and algorithms can be applied to the analysis and interpretation of anisotropic seismic data by, where appropriate, replacing the elastic parameter data with anisotropic elastic parameter data for seismic modeling and visualization.

BRIEF DESCRIPTION OF THE DRAWINGS

The present invention, its features and the advantages it offers are better understood by referring to the following detailed description and attached drawings, in which.

DESCRIPTION OF THE PREFERRED EMBODIMENTS

Figure 1:
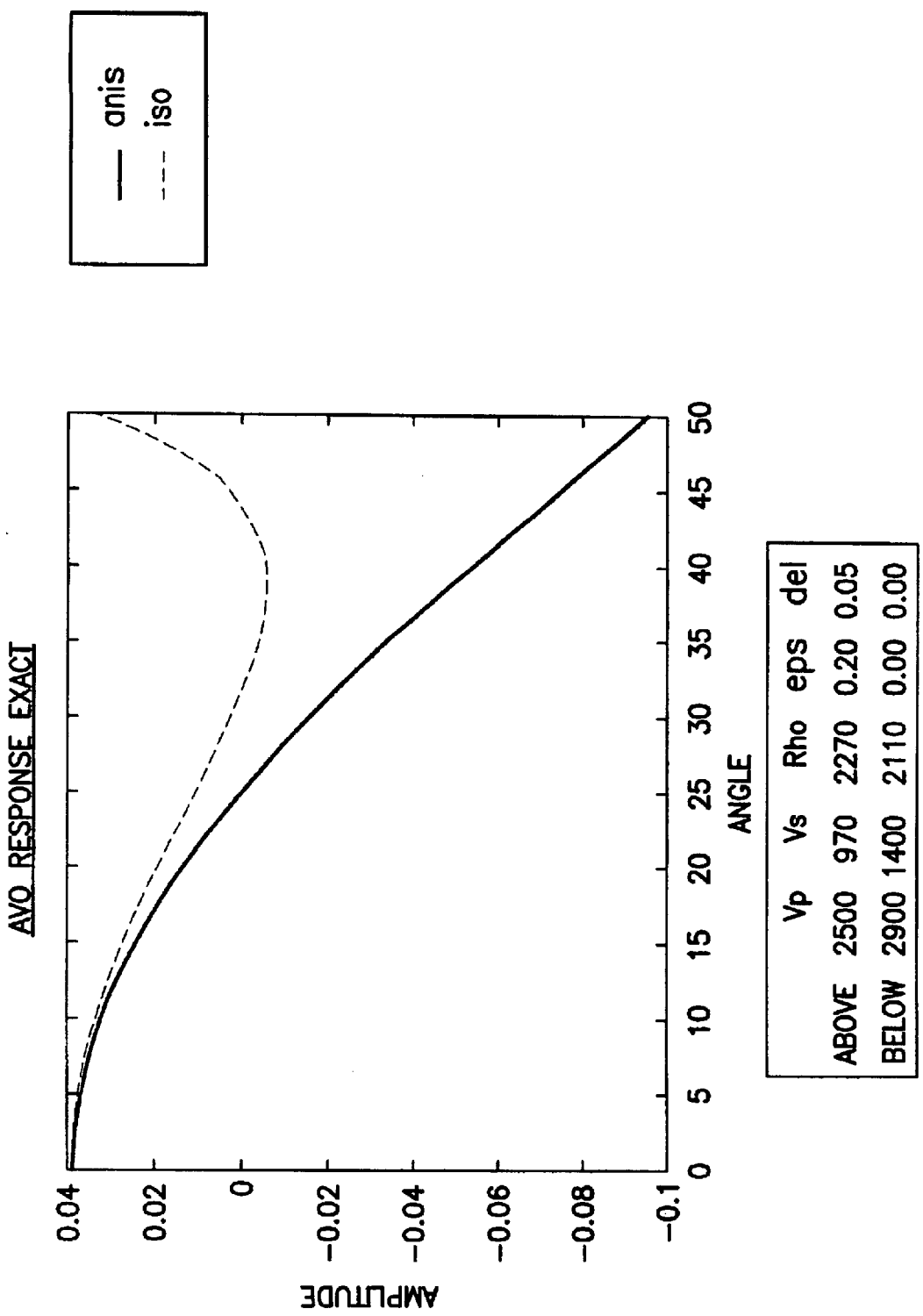
FIG. 1 is a plot of isotropic and anisotropic seismic reflection coefficient amplitudes as a function of angle.

The present invention can be embodied in many different forms. The disclosure and description of the invention in the drawings and this description are illustrative and explanatory thereof. Changes in the sequence of processing steps, parameters in the processing and process details and other modifications may be made without departing from the scope of the invention.

The present invention embodies a novel, practical method to incorporate and account for the effects of anisotropy in seismic applications. At the core of the method lies a novel method for transforming earth elastic and anisotropy parameters to new earth parameters and their utilization in such applications as seismic modeling, wavelet estimation, inversion, the analysis and interpretation of inversion results, and the analysis and interpretation of seismic data. A feature of the method of the present invention is that for a given seismic forward modeling method, the forward modeling of seismic amplitudes with the new earth parameters adequately approximates the equivalent modeling wherein anisotropy is properly taken into account. The transformed earth parameters are referred to as anisotropic elastic parameters.

In seismic data, important information about the earth elastic and anisotropy parameters is embedded in the change of seismic amplitudes as a function of the separation between sources and receivers. This is referred to as AVO (Amplitude Versus Offset). In many applications AVO data is converted to other domains, for example to angles for AVA (Amplitude Versus Angle) analysis and interpretation. Further, rather than studying the data at the level of records, practitioners often use partial stacks of records. In this way data is reduced and robustness improved, yet the key characteristics of the amplitude changes with offset, angle or other parameter are retained. For purposes of the description of this invention, and in keeping with industry practice, all methods that make use of seismic amplitude changes originating from the measurement of seismic data holding data records with different source receiver separation are collectively referred to as AVO methods.

The relationship that links the subsurface parameters to seismic AVO amplitudes is determined by seismic wave propagation modeling. For the most general case this leads to a very complex relationship that can only be solved by numerical wave equation modeling. Most modeling methods in practical use today are based on a simplified wave propagation model.

An example of a commonly used class of AVO modeling methods, as described by Castagna, J. P. and Backus, M. M., "Offset-dependent reflectivity—theory and practice of AVO analysis", 1993, Investigations in Geophysics vol. 8, Society of Exploration Geophysicists, is based on the following simplified seismic wave propagation model: the earth is stratified into isotropic parallel layers; seismic waves propagate as plane waves impinging on each interface at a constant angle; each interface acts as an independent reflector; transmission effects are neglected, other than raybending; and the calculated plane wave reflection coefficients are based on the assumption of isotropic half spaces above and below the reflector interface.

Thus, in this specific example, a very simple model of the earth and of wave propagation is assumed. As described by Castagna, J. P. and Backus, M. M., "Offset-dependent reflectivity—theory and practice of AVO analysis", 1993, Investigations in Geophysics vol. 8, Society of Exploration Geophysicists, even in this example of a simplified seismic wave propagation model, the resulting Zoeppritz equations that describe the AVO relationship are quite complex. Practitioners have therefore turned to approximations of the Zoeppritz equations. In particular, the 3-term Aki-Richards, the 3-term Shuey (which is a rearrangement of the Aki-Richards equation) and 2-term Shuey approximations are widely used. These forward modeling equations or, in more modem methods, the Zoeppritz equations, form the basis for modeling in many seismic AVO inversion methods in use today, as further detailed in the references cited above.

To further expand the application of AVO methods requires the use of a more practical model than described above. One important extension is to take into account anisotropy. Anisotropy can seriously affect AVO amplitudes, as demonstrated in FIG. 1. FIG. 1 illustrates, for the example of polar anisotropy, the effect that anisotropy can have on seismic reflection coefficient amplitudes. The figure shows the modeled amplitude response of a plane wave incident on a horizontal interface between two layers with and without incorporating shale anisotropy. The seismic reflection amplitudes are shown as a function of angle (in degrees) for a North Sea case. The solid curve (anis) shows the analytic (exact) reflection coefficient response for a plane wave reflecting from a single, horizontal interface for the case of polar anisotropy and incident and reflected pressure wave. For comparison, the dashed curve (iso) shows the exact solution for the isotropic reflection coefficients. The elastic and anisotropy parameters of the layer above and the layer below the interface are specified in FIG. 1, where $V_p$ is the pressure wave velocity in m/s, $V_s$ is the shear wave velocity in m/s, Rho is the density in kg/m$^3$ and eps and del are the anisotropy Thomsen parameters $\epsilon, \delta$ respectively. In this example the properties in the layer above are for an anisotropic shale and those for the layer below are for a water charged sand that is assumed isotropic. The example clearly shows the effect that anisotropy can have on the seismic amplitudes. Rueger, A., 2002, "Reflection Coefficients and Azimuthal AVO Analysis in Anisotropic Media", geophysical monograph series No. 10, Society of Exploration Geophysicists; and Thomsen, L., 2002, "Understanding Seismic Anisotropy in Exploration and Exploitation", Distinguished Instructor Series No. 5, Society of Exploration Geophysicists/European Association of Geoscientists and Engineers describe the effects of different types of anisotropy on different aspects of seismic wave propagation, including the effects on seismic reflection amplitudes. To describe the effects of anisotropy these authors use the so-called Thomsen parameters $\epsilon, \delta, \gamma$. These Thomsen parameters act as rock properties just as the elastic parameters, such as p-wave, s-wave velocities and density. The Thomsen parameters provide a convenient way to describe anisotropy. One advantage of using these parameters is that isotropic modeling results are obtained in the special case that the Thomsen parameters are set to zero (or constant). In addition, the isotropic modeling methods so obtained correspond exactly to well-known isotropic modeling methods. Alternative parameterizations are also used. In the following, Thomsen parameters are used in derivations and for illustration. Use of the Thomsen parameters is, however, without loss of generality and other parameterizations could be used as well.

One of the objectives of the present invention is to define a new class of earth parameters derived from the anisotropy parameters and the elastic parameters, termed anisotropic elastic parameters, such that the effects of anisotropy can be modeled to an acceptable level of accuracy when using these parameters in the isotropic modeling of anisotropic seismic data.

This procedure is first illustrated for the case of polar anisotropy for p-wave sources and receivers, and then generalized. Rueger, A., 2002, "Reflection Coefficients and Azimuthal AVO Analysis in Anisotropic Media", geophysical monograph series No. 10, Society of Exploration Geophysicists; and Thomsen, L., 2002, "Understanding Seismic Anisotropy in Exploration and Exploitation", Distinguished Instructor Series No. 5, Society of Exploration Geophysicists/European Association of Geoscientists and Engineers describe how to incorporate polar anisotropy in AVO modeling. They generalize the above isotropic model to model plane wave reflection in case of anisotropic media. Analogous to the approximation of the Zoeppritz equations by the 3-term Aki-Richards or Shuey equations, they show that for the AVO plane wave reflection coefficients for a flat interface bounded by anisotropic half spaces a convenient approximation to the AVO relationship can be obtained. The 3-term expression they derive is:

$$R_p(\theta) = R_0 + R_2 \sin^2\theta + R_4 \sin^2\theta \tan^2\theta \qquad (2)$$

with the 3 "reflectivity" terms:

$$R_0 = \frac{1}{2} \frac{\Delta Z_p}{\overline{Z}_p}$$

$$R_2 = \frac{1}{2} \left\{ \frac{\Delta V_p}{\overline{V}_p} - \left( \frac{2\overline{V}_s}{\overline{V}_p} \right)^2 \frac{\Delta G}{\overline{G}} + \Delta\delta \right\}$$

$$R_4 = \frac{1}{2} \left\{ \frac{\Delta V_p}{\overline{V}_p} + \Delta\epsilon \right\}$$

with:

$R_P(\theta)$ P wave reflection coefficient for incident angle $\theta$ $\overline{Z}_P, \overline{V}_P, \overline{V}_s, \overline{G}$ average acoustic impedance, p-wave velocity, s-wave velocity and vertical shear modulus $\rho V_s^2$ respectively $\Delta Z_P, \Delta V_P, \Delta V_s, \Delta G$ acoustic impedance, p-wave velocity, s-wave velocity and vertical shear modulus contrasts respectively $\Delta\epsilon, \Delta\delta$ contrast in the Thomsen anisotropy parameters These equations correspond to the analogous equations for the isotropic case when the anisotropy contrasts are 0.

The next step is to derive the desired anisotropic elastic parameters, which are denoted by "'". Starting with the $R_4$ term, the anisotropic elastic parameter contrast $\Delta V'_p/\overline{V}'_p$, is defined as:

$$\frac{\Delta V'_p}{\overline{V}'_p} = \frac{\Delta V_p}{\overline{V}_p} + \Delta \varepsilon \qquad (2a)$$

Then, substituting into the $R_0$ term and using the small contrast expansion of the impedance product term gives:

$$\frac{\Delta \rho'_p}{\overline{\rho}'_p} = \frac{\Delta \rho_p}{\overline{\rho}_p} - \Delta \varepsilon \qquad (2b)$$

Finally, defining $K=(\overline{V}_S/\overline{V}_P)^2$, substitution into the $R_2$ term gives:

$$\frac{\Delta V'_s}{\overline{V}'_s} = \frac{\Delta V_s}{\overline{V}_x} + \frac{(4K+1)\Delta\varepsilon}{8K} - \frac{\Delta\delta}{8K} \qquad (2c)$$

Back substituting these anisotropic elastic parameters in the isotropic equivalent of expression (1) (anisotropy contrasts set to 0) shows that expression (1) is exactly recovered.

Thus, straightforward expressions are obtained for the anisotropic elastic parameter contrasts. These expressions are composed of a mixture of relative elastic parameter and absolute anisotropy parameter contrasts. In practice, it is advantageous to recover rock properties rather than their relative contrasts. In the current form, to recover the absolute quantities $V'_P$, $V'_S$, $\rho'$ from the above relative contrasts requires integration. This can introduce low frequency drift and requires some absolute reference. It is preferable to find functions that modify $V_P$, $V_S$, $\rho$ on a point-by-point basis, but in such a way that the expressions (2a–c) are recovered or at least closely approximated.

A close approximation can be obtained by approximating the contrast terms of the anisotropy parameters with new parameters that can be expressed as relative contrasts. One way this can be achieved is with the following simple expression:

$$\varepsilon_r = \varepsilon + l - \overline{\varepsilon}$$

The validity of the approximation is verified by calculating the relative contrast of $\varepsilon_r$.
Taking into account $\varepsilon \ll 1$ we see that:

$$\frac{\Delta \varepsilon_r}{\overline{\varepsilon}_r} \approx \Delta \varepsilon$$

The same holds true for $\delta$ and $\gamma$. When multiple layers are considered, the average may be taken over the set of layers.

$$\frac{\Delta V'_p}{\overline{V}'_p} = \frac{\Delta V_p}{\overline{V}_p} + \frac{\Delta \varepsilon_r}{\overline{\varepsilon}_r}$$

Substituting in expression (2a) gives:
This is the differential approximation for a product term broken down into the addition of differential components. Hence, for small contrasts:

$$V'_P = \varepsilon_r V_P \qquad (3a)$$

In the same way expression (2b) gives:

$$\rho' = \varepsilon_r^{-1} \rho \qquad (3b)$$

And, from expression (2c):

$$V_S = \varepsilon_r^{(4K+1)/8K} \delta^{-1/8K} V_S \qquad (3c)$$

Note that for convenience the function:

$$\varepsilon_r = (\varepsilon + l - \overline{\varepsilon})/(l - \overline{\varepsilon}) \qquad (4)$$

can also be used in the above, and, analogously, the same for $\delta_r$ and $\gamma_r$. This has the advantage that the anisotropic elastic parameters are scaled such that when $\varepsilon$, $\delta$, $\gamma$ equals 0, they are equal to the input elastic parameters. In comparative data analyses, this nicely emphasizes zones with anisotropy.

Figure 2:
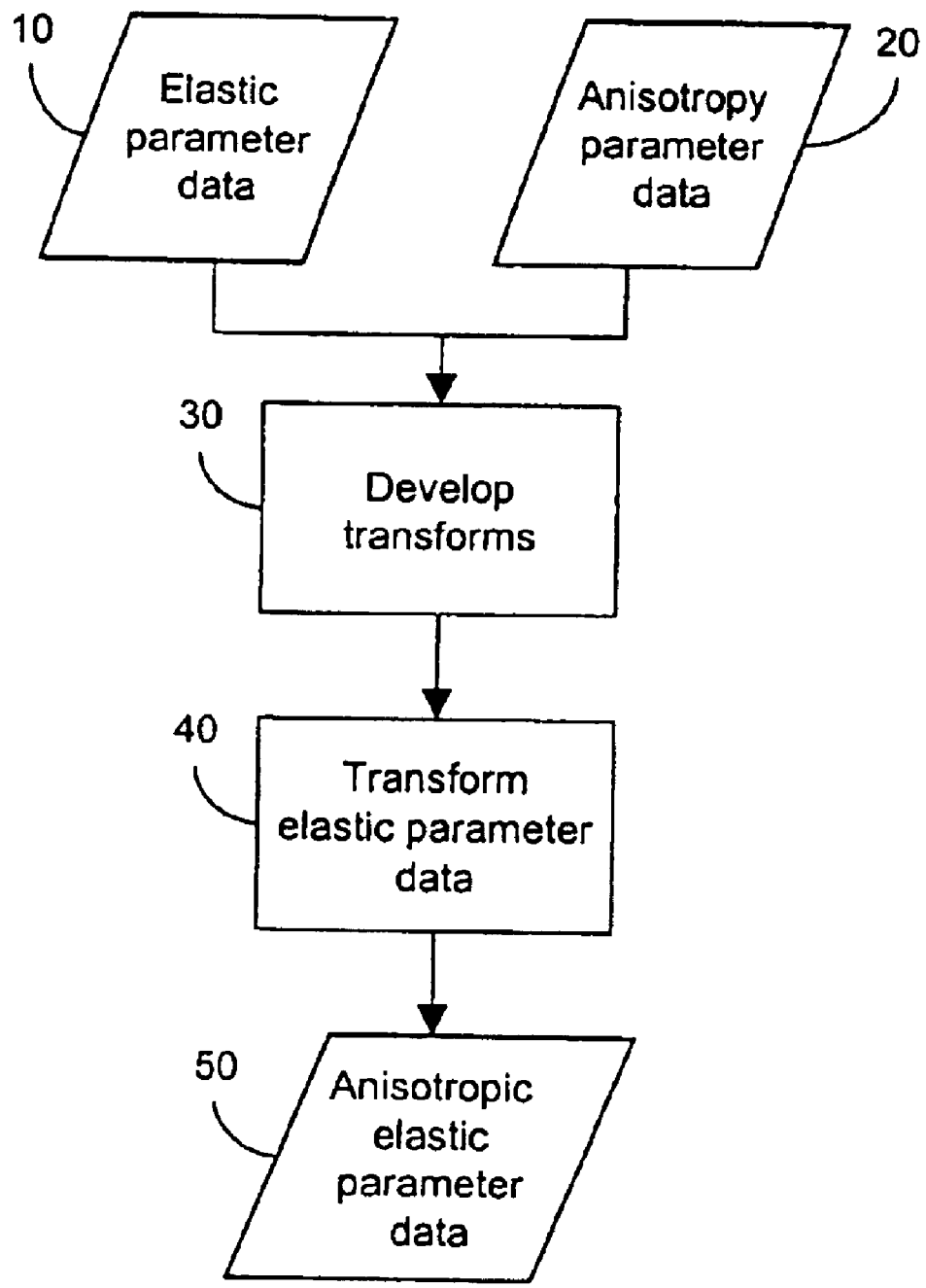
FIG. 2 is a flow chart of a method according to the present invention.

FIG. 2 is a flow chart illustrating the process of one embodiment of the present invention by which to derive anisotropic elastic parameters. Steps 10 and 20 represent obtaining the earth elastic parameter data and the earth anisotropy parameter data, respectively, for an object of interest. In step 30 the transforms are developed, and in step 40 the transforms are applied to generate the anisotropic elastic parameters. In more detail, step 30 includes transforming the earth elastic parameter data based on the earth anisotropy parameter data to obtain anisotropic elastic parameter data. The anisotropic elastic parameter data may be applied to at least one of the following methods: isotropic seismic modeling method, an isotropic seismic analysis and interpretation method, an isotropic seismic wavelet estimation method, an isotropic seismic inversion method, or an isotropic method for analysis and interpretation of inversion results. The anisotropic elastic parameters are produced in step 50.

The method may also include the step of substituting the anisotropic elastic parameter data in for the isotopic elastic parameters during isotopic seismic modeling method to synthesize anisotropic seismic data. Additionally, the synthesized anisotropic seismic data may be used in an isotropic seismic analysis and interpretation method for analysis and interpretation of anisotropic seismic data. Accordingly, the anisotropic elastic parameter data may be substituted for the isotropic elastic parameters in any of the above-mentioned methods.

The derivation discussed herein above is one example of the development of transforms in step 30. As will be discussed, there are many options available to develop transforms, dependent on the type(s) of anisotropy, the seismic wave type(s) and the desired accuracy.

Another embodiment of the present invention is directed to a method for approximating an isotropic seismic modeling by applying isotropic seismic modeling. The method includes an initial step of inputting earth elastic parameter data and earth anisotropy parameter data for an object of interest. Next, the earth elastic parameter data is transformed to obtain anisotropic elastic parameter data based on the earth anisotropy parameter data. Isotropic seismic modeling is then applied on the transformed anisotropic elastic parameter data. The resulting modeled anisotropic seismic data is an approximation of seismic data obtained by a corresponding anisotropic seismic modeling. The processed anisotropic seismic data is then outputted. The method may further include a step of substituting the anisotropic elastic parameter data for isotropic elastic parameter data to synthesize the anisotropic seismic data. The synthesized anisotropic seismic data may be used in an isotropic analysis and interpretation method for analysis and interpretation of the anisotropic seismic data. The object of interest may include bore hole data, 1-D earth models, 2-D earth models, or 3-D earth models. This step of transforming may further include applying appropriate transform functions that convert the earth elastic parameter data and earth anisotropy parameter data to the anisotropic elastic parameter data.

Figure 3:
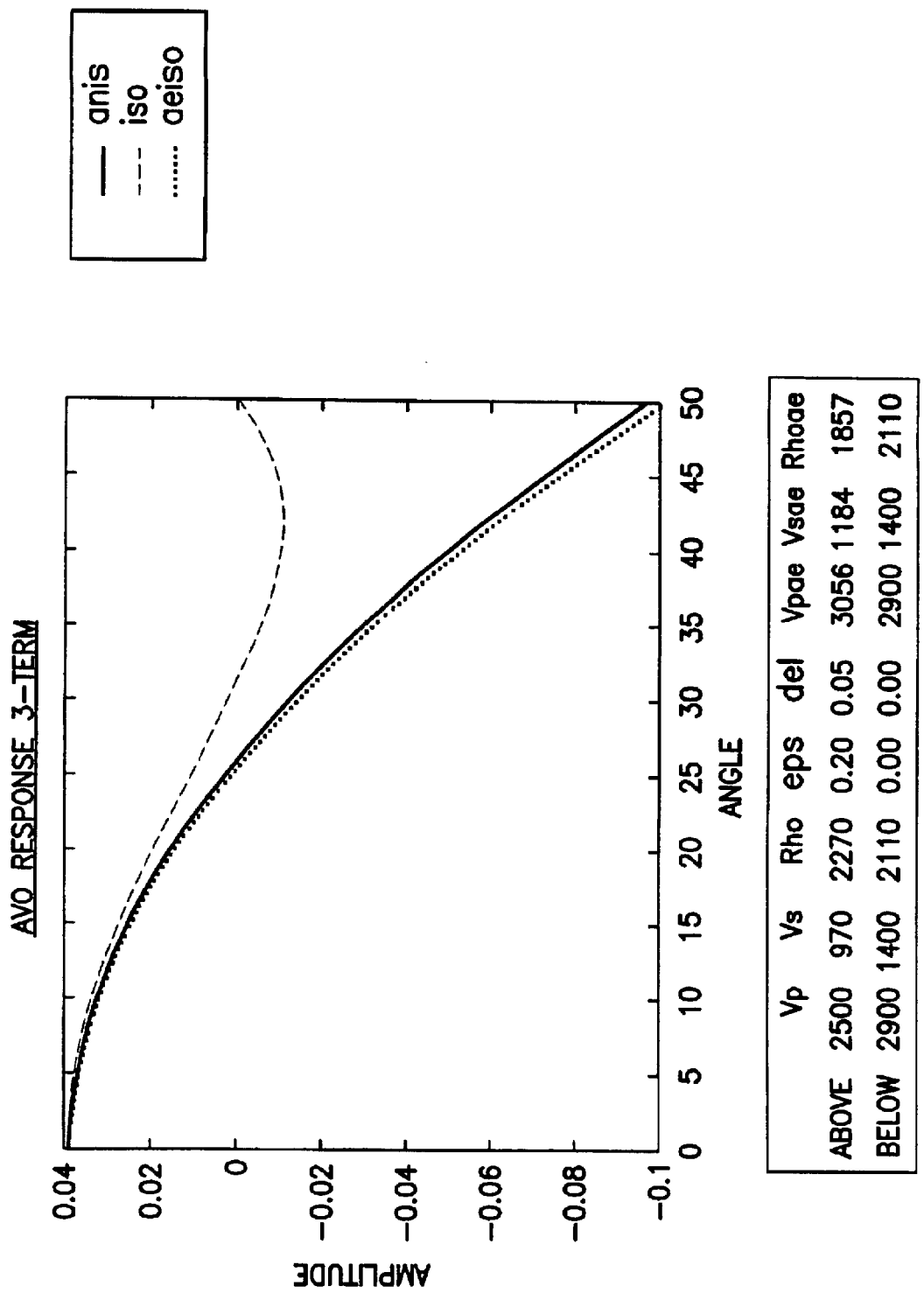
FIG. 3 is a plot of seismic reflection coefficient amplitudes as a function of angle for isotropic elastic parameters, anisotropic elastic parameters and isotropic modeling with the anisotropic elastic parameters for one location.
Figure 4:
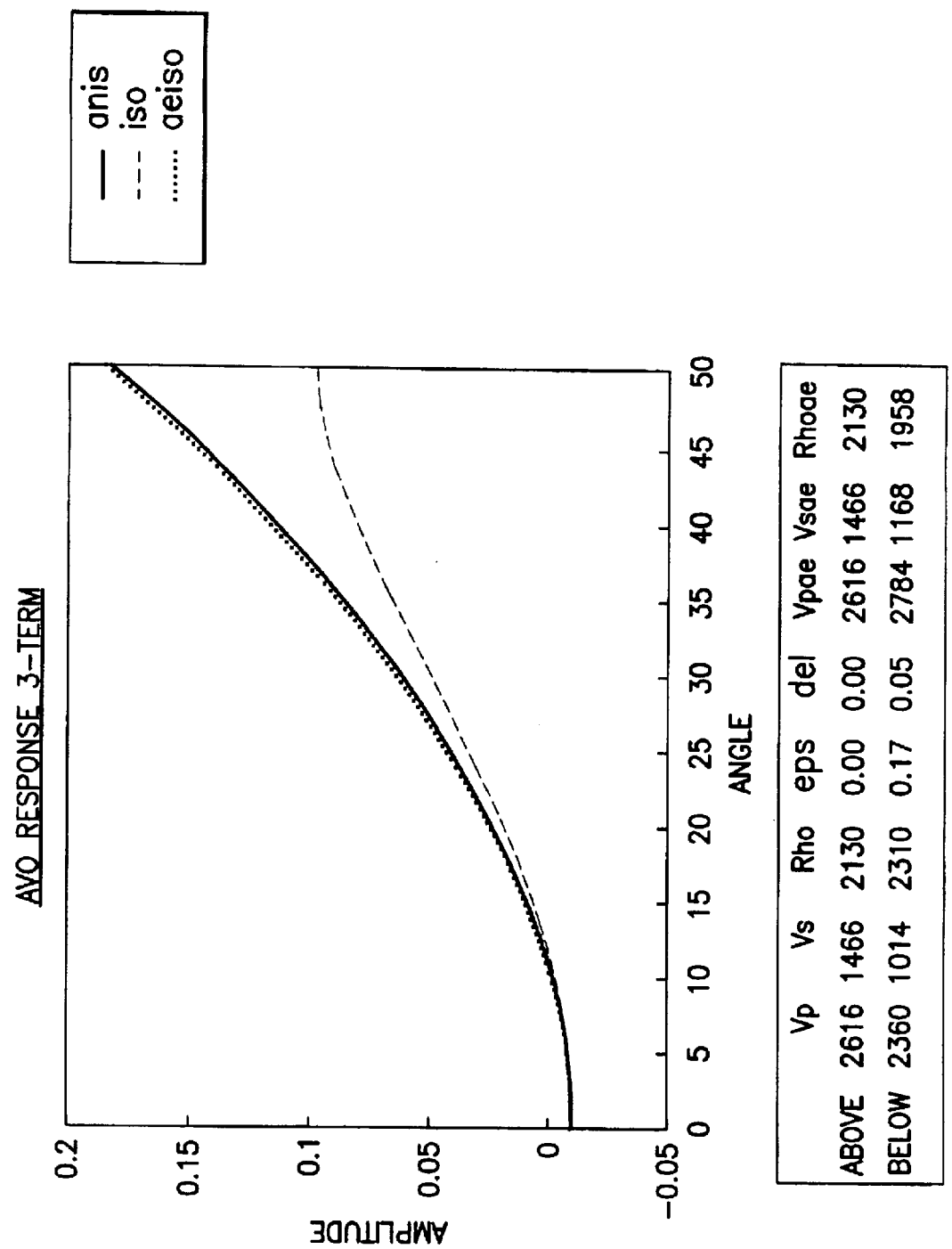
FIG. 4 is a plot of seismic reflection coefficient amplitudes as a function of angle for isotropic elastic parameters, anisotropic elastic parameters and isotropic modeling with the anisotropic elastic parameters for another location.

FIG. 3 and FIG. 4 illustrate modeling results for North Sea and West Africa rock property data, respectively, that exhibit relatively strong anisotropy contrasts. FIG. 3 illustrates the effect, using the same model as for FIG. 1, of using the 3-term approximation. In addition, the dotted curve (aeiso) shows the result of isotropic modeling with the anisotropic elastic parameters specified in the table, where Vpae, Vsae and Rho are the anisotropic elastic pressure wave velocity, shear wave velocity and density, respectively, calculated from the transform expressions (3) and using the normalization expression (4). The results show that isotropic modeling with the anisotropic elastic parameters closely approximates anisotropic modeling. FIG. 4 illustrates the same results as in FIG. 3, but for a West Africa case. In this example the properties in the layer above are for an isotropic oil charged sand and for the layer below are for an anisotropic shale. Again, the results illustrate that isotropic modeling with the anisotropic elastic parameters closely approximates anisotropic modeling.

Modeling with the above equations clearly supports that, even in these cases, the approximation of anisotropic modeling by using the newly defined anisotropic elastic parameters in isotropic modeling is accurate.

Figure 5:
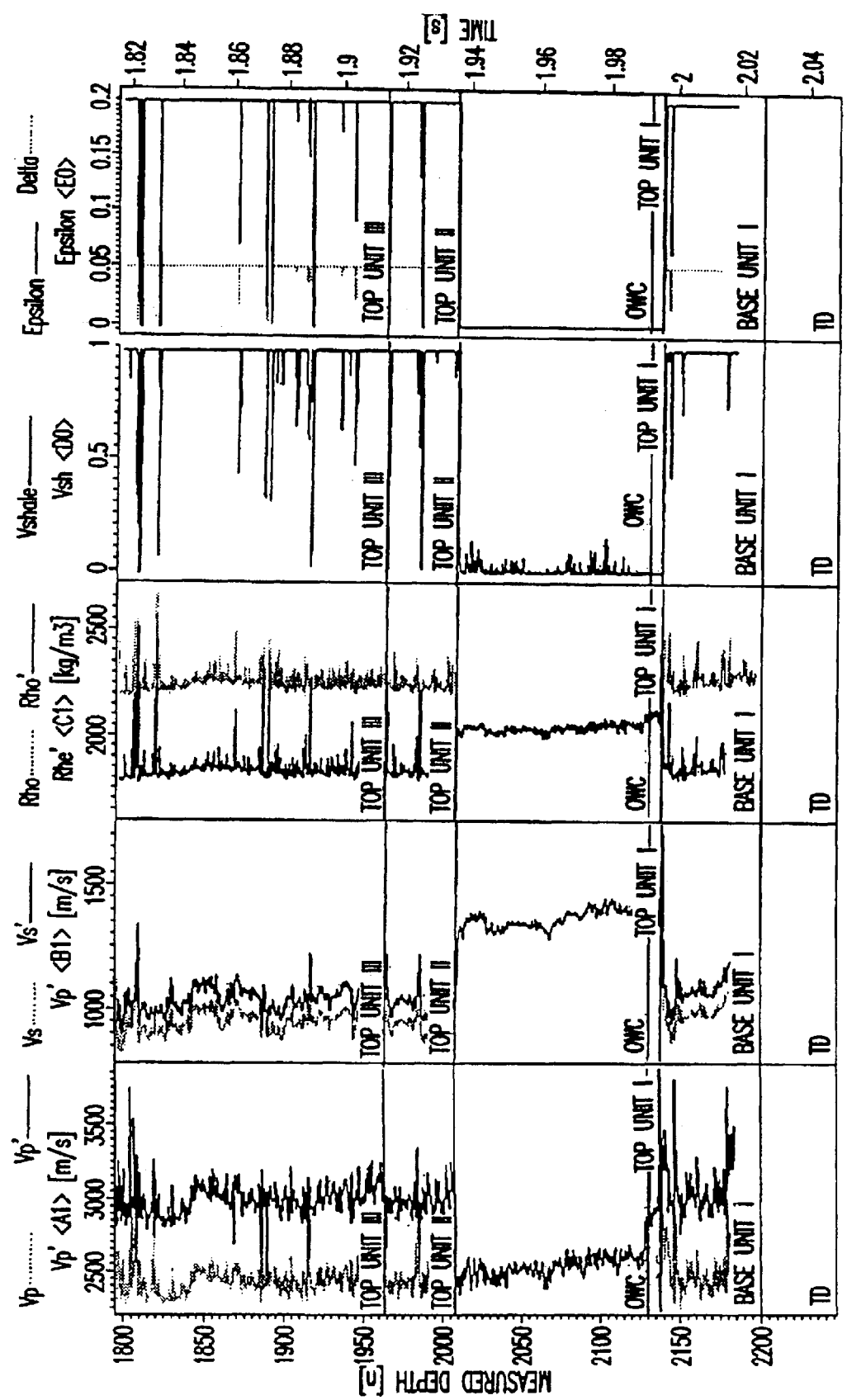
FIG. 5 is a comparison of elastic parameters and the anisotropic elastic parameters on bore hole log data.

FIG. 5 shows panels with bore hole log data to demonstrate the effect of transforming elastic parameters to anisotropic elastic parameters for the case of polar anisotropy and incident and reflecting pressure waves. FIG. 4 illustrates a suite of bore hole logs with pressure (Vp) and shear (Vs) wave velocity and density (Rho) elastic parameters, the corresponding anisotropic elastic parameters for polar anisotropy and incident and reflecting pressure waves, the shale volume log (Vshale) and logs of $\epsilon_r$ and $\delta_r$. The normalization of expression (4) has been applied to achieve that the anisotropic elastic parameters are equal to the elastic parameters in the pure sand sections (where the shale volume is zero), for example, between Top Unit II and Top Unit I.

The above derivation is based on the 3-term approximations to the exact isotropic and exact anisotropic modeling solutions for the plane wave, single horizontal interface model. In practice this may not be the desirable model as different situations in regards to the generation of anisotropic elastic parameters can occur, for example, to handle the following: azimuthal anisotropy for p-wave data; different types of anisotropy for shear and converted wave seismic data; use of the exact equations rather than the 3-term approximation; and use of more complex modeling methods.

Rueger, A., 2002, "Reflection Coefficients and Azimuthal AVO Analysis in Anisotropic Media", geophysical monograph series No. 10, Society of Exploration Geophysicists demonstrates that, for the plane wave, horizontal interface model, for different types of anisotropy and wave types (pressure shear and converted) the exact solution can be approximated by 3-term equations similar in form to equation (1). Following the derivation procedure above leads to the conclusion that, when using the 3-term equations, the solutions for each of the anisotropic elastic parameters take the general form:

$$E' = \epsilon_r^x \delta_r^y \gamma_r^z E \quad (5)$$

Where E is any of the elastic parameters and x,y,z are constants that may be a function of K. Constants x,y,z will generally differ for each of the elastic parameters, for each type of anisotropy and for each wave type (pressure, shear and converted wave). It is also noted that the $\bar{\epsilon}, \bar{\delta}, \bar{\gamma}$ averages are part of the formula. When multiple layers are considered, it can be advantageous to consider these averages as parameters also.

In this way transform functions are obtained that have parameters that control the transform. In some cases appropriate values for these transform parameters can be obtained analytically. However, in another embodiment of the present invention, an iterative procedure can also be readily followed to obtain the appropriate values for the transform parameters. This results in further important benefits such as: the exact modeling methods rather than the 3-term approximations can be used as reference for the case of the simple single flat interface model, or more complex modeling methods can be applied; and other transform functions with other functional forms and with other transform parameters than expression (5) can be applied to evaluate if a better approximation can be obtained.

Figure 6:
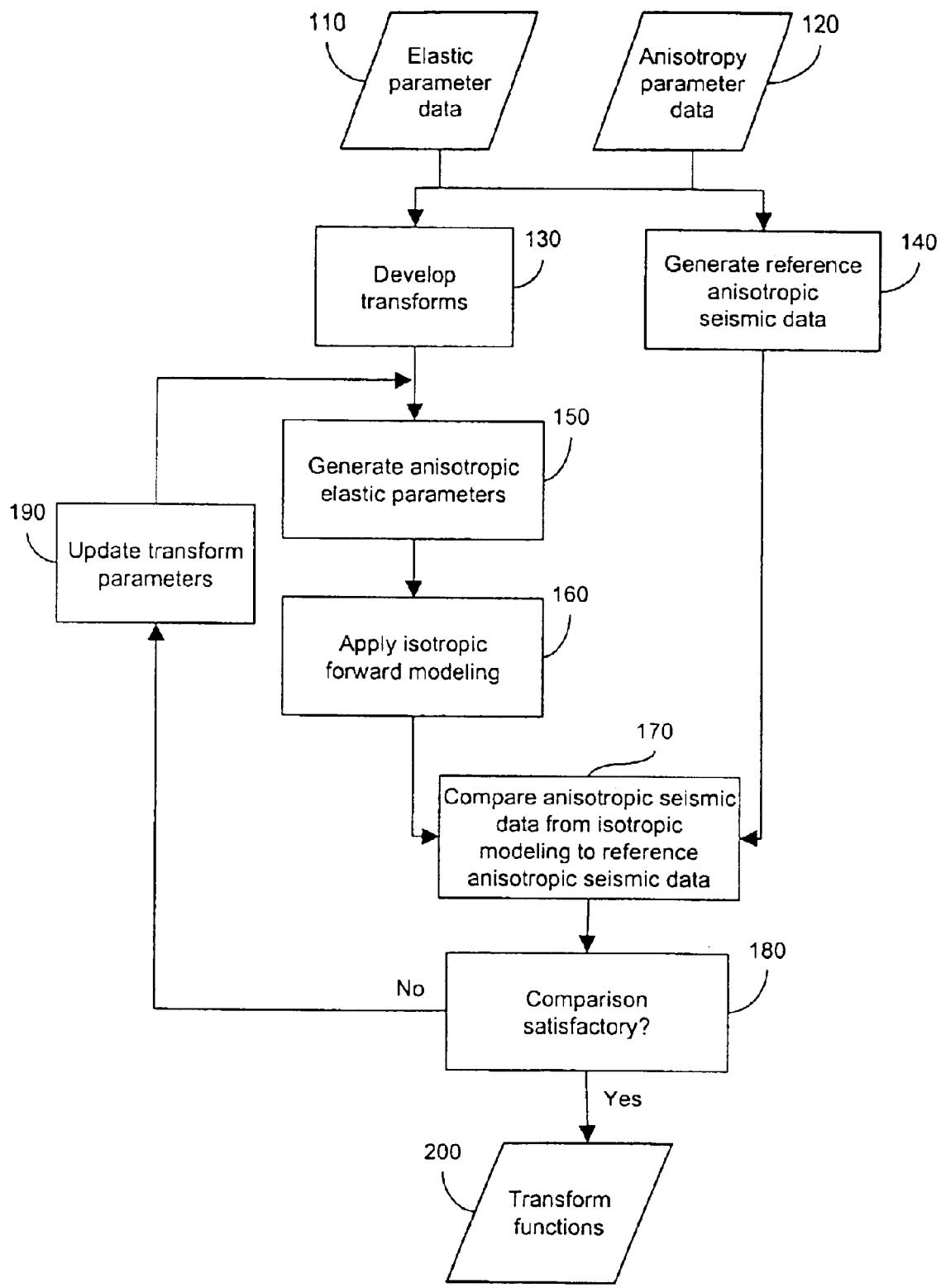
FIG. 6 is a flow chart of a method according to another embodiment of the present invention.

The steps in the iterative procedure are further illustrated in the flow chart of FIG. 6. Initially, steps 110 and 120 include obtaining elastic parameter data and anisotropic parameter data, respectively. In step 140, synthetic anisotropic seismic amplitude data is generated using an appropriate anisotropic forward modeling method selected on such criteria as the type(s) of anisotropy, wave type(s), model complexity and modeling accuracy. Such data is termed reference anisotropic seismic amplitude data. In step 130, transform functions are developed to transform the earth elastic and anisotropy parameters to anisotropic elastic parameters. It can be assumed that the transform functions have certain parameters (the transform parameters) that may be modified. A first set of transform functions may be developed by using some set of initial transform parameters. Anisotropic elastic parameters are then generated in step 150 by applying the transforms. Next in step 160, isotropic forward modeling is applied with the anisotropic elastic parameters using the isotropic equivalent of the anisotropic forward modeling method used in step 140 to generate anisotropic seismic data. This equivalence can generally be achieved by setting the anisotropy parameters to 0 (or constant) in the anisotropic forward modeling method. The anisotropic seismic data generated by isotropic modeling with the anisotropic elastic parameters is then compared with the reference anisotropic seismic amplitude data in step 170. In step 180, the comparison is judged. If the comparison under step 180 is not satisfactory, the parameters of the transform functions are updated in step 190 and the transform functions of step 130 modified accordingly. Repeat steps 150–190 until a satisfactory match is obtained. If the comparison under step 180 is satisfactory, the set of transform functions is produced in step 200.

The output of the method of this embodiment is a set of transform functions calibrated for the particular anisotropic forward modeling method selected. The generated anisotropic elastic parameters may also be output, as may the synthesized anisotropic seismic data. The forward modeling method referred to in step 140 may be a method for a two-layer (one interface) earth model, or may be a method for multiple layers, or may be a method for a fully inhomogeneous earth. In the last two cases the modeling and comparison may be carried out over a limited interval of interest. The modification in step 190 to a fit-for-purpose level of accuracy may be done automatically using an optimization method, or interactively or in combination. Instead of in step 160 using the anisotropic forward modeling method, the equivalent isotropic forward modeling method may also be used.

It is recognized that in the method utilizing an iterative procedure to find satisfactory transform parameters the functional form of the transforms is set in the transform development step. If a satisfactory comparison is not achieved after sufficient iteration, alternative transform functions may be evaluated.

Figure 7:
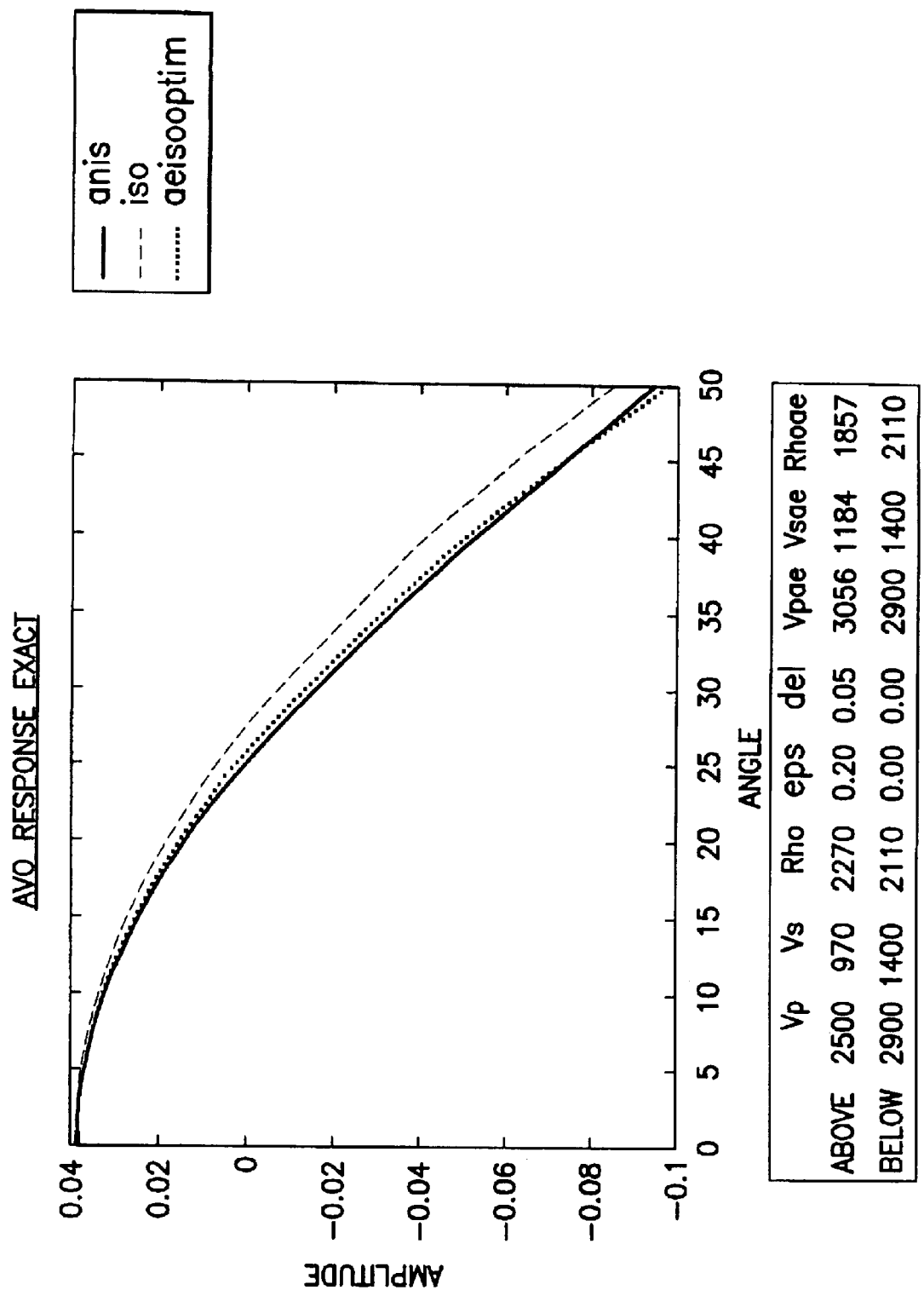
FIG. 7 is a plot of isotropic and anisotropic seismic reflection coefficient amplitudes as a function of angle using a process shown in FIG. 6.

An example of the application of the above procedure is shown in FIG. 7. FIG. 7 illustrates the application of the iterative procedure to the North Sea data case. In this case the solid curve (anis) represents the exact, analytic anisotropic modeling result used as reference. The dashed curve (aeiso) represents the curve obtained by isotropic exact modeling but using the anisotropic elastic parameters derived with the 3-term equations. The dotted curve (aeisooptim) represents the curve obtained with the iterative procedure, where it sufficed to modify only the transform for the shear wave velocity according to a transform of the form in expression (5) but without having to incorporate γ. The results show that the match is strongly improved by the iterative procedure and that again anisotropic elastic parameters can be obtained such that isotropic modeling with the anisotropic elastic parameters closely approximates anisotropic modeling.

The proposed anisotropic elastic parameter transform expressions achieve the objective that the anisotropic elastic parameters are straightforwardly obtained by a point-by-point transform of the elastic parameters. The important implication is that, to handle anisotropy, all available isotropic AVO methods for such applications as seismic modeling, wavelet estimation, the inversion and analysis and interpretation of inversion results, and the analysis and interpretation of seismic amplitude data can continue to be applied simply by replacing the isotropic elastic parameters by the above-defined anisotropic elastic parameters at the appropriate points in these methods. Within these methods the transforms will typically be applied to bore hole data or to 1-D, 2-D or 3-D data sets with the data points in those data sets representing earth elastic and anisotropy parameters at some spatial location or locations in the earth. It is noted that such representations allow for specification of the vertical location in terms of seismic travel time or in distance or depth. For convenience, irrespective of their actual storage structure and method of representation, all these representations are referred to as 1-D, 2-D or 3-D earth models.

In the above, a method is derived to obtain anisotropic elastic parameters using point-by-point transforms. This is convenient, but is not a difficult requirement. Anisotropic elastic parameters can also be obtained by integration of the contrast expressions such as expression (2). This may result in improved accuracy, as the conversion of the anisotropy parameters to relative contrasts is not needed. However, this gain may be offset by the practical observation that integration can introduce low frequency drift and requires handling of the integration constant. This may not impact further use of the anisotropic elastic parameters, for example, in certain bandlimited seismic modeling and inversion methods where these effects are removed in the method. Hence, these are examples where anisotropic elastic parameters obtained by integration can be effectively used. In fact, in certain of these methods bandlimited anisotropic elastic parameters can be used.

An alternative method is to combine anisotropic elastic parameters obtained by an integration procedure with the anisotropic elastic parameters obtained with the point-by-point transforms. This can be achieved by replacing the low frequency part of the result obtained by the integration procedure with the equivalent part obtained with the point-by-point transforms.

The transform parameters, such as x,y,z, can be a function of depth or lateral position in the earth. For example, the above analytic derivation shows that these transform parameters may be a function of K. It is well known that K varies spatially in the earth. In the proposed method the transform parameters are assumed constant when a single interface is used for deriving the transforms or are assumed constant over the study interval of interest. When these transforms are applied over longer intervals or areas, this may lead to a loss of accuracy. This same issue occurs in conventional seismic AVO analysis, as for example discussed in Fatti, J. L., Smith, G. C., Vail, P. J., Strauss, P. J. and Levitt, P. R., 1994, "Detection of gas in sandstone reservoirs using AVO analysis: A 3D seismic case history using the Geostack technique", Geophysics, volume 59, pp. 1362–1376. Allowing laterally and vertically varying trends in the variables overcomes this problem, where a trend constitutes a spatially varying variable such that its bandwidth is lower than that of the seismic data. The same method can be used for anisotropic elastic parameters by allowing these parameters to take the form of laterally and vertically varying trends.

The present invention is also directed to a device for anisotropic processing of earth elastic parameter data and the application of processed data. The device includes a first input means for inputting earth elastic parameter data of an object of interest; a second input means for inputting earth anisotropy parameter data of the object of interest; a transform means for transforming, based on the input earth anisotropy parameter data, the input earth elastic parameter data to obtain anisotropic elastic parameter data; a processor for applying the anisotropic elastic parameter data in at least one of the following methods: i) an isotropic seismic modeling method, ii) an isotropic seismic analysis and interpretation method, iii) an isotropic seismic wavelet estimation method, iv) an isotropic seismic inversion method and v) an isotropic method for the analysis and interpretation of inversion results; and an output means for outputting the processed anisotropic elastic parameter data.

Another embodiment of the device of the present invention includes a device for approximating anisotropic seismic modeling by applying isotropic seismic modeling. The device includes a first input means for inputting earth elastic parameter data of an object of interest; a second input means for inputting earth anisotropy parameter data of the object of interest; a transform means for transforming, based on the input earth anisotropy parameter data, the input earth elastic parameter data to obtain anisotropic elastic parameter data; a processor for applying the isotropic seismic modeling on the transformed anisotropic elastic parameter data, the resulting modeled anisotropic seismic data being an approximation of the data obtained by a corresponding anisotropic seismic modeling; and an output means for outputting the processed anisotropic seismic data.

Figure 8:
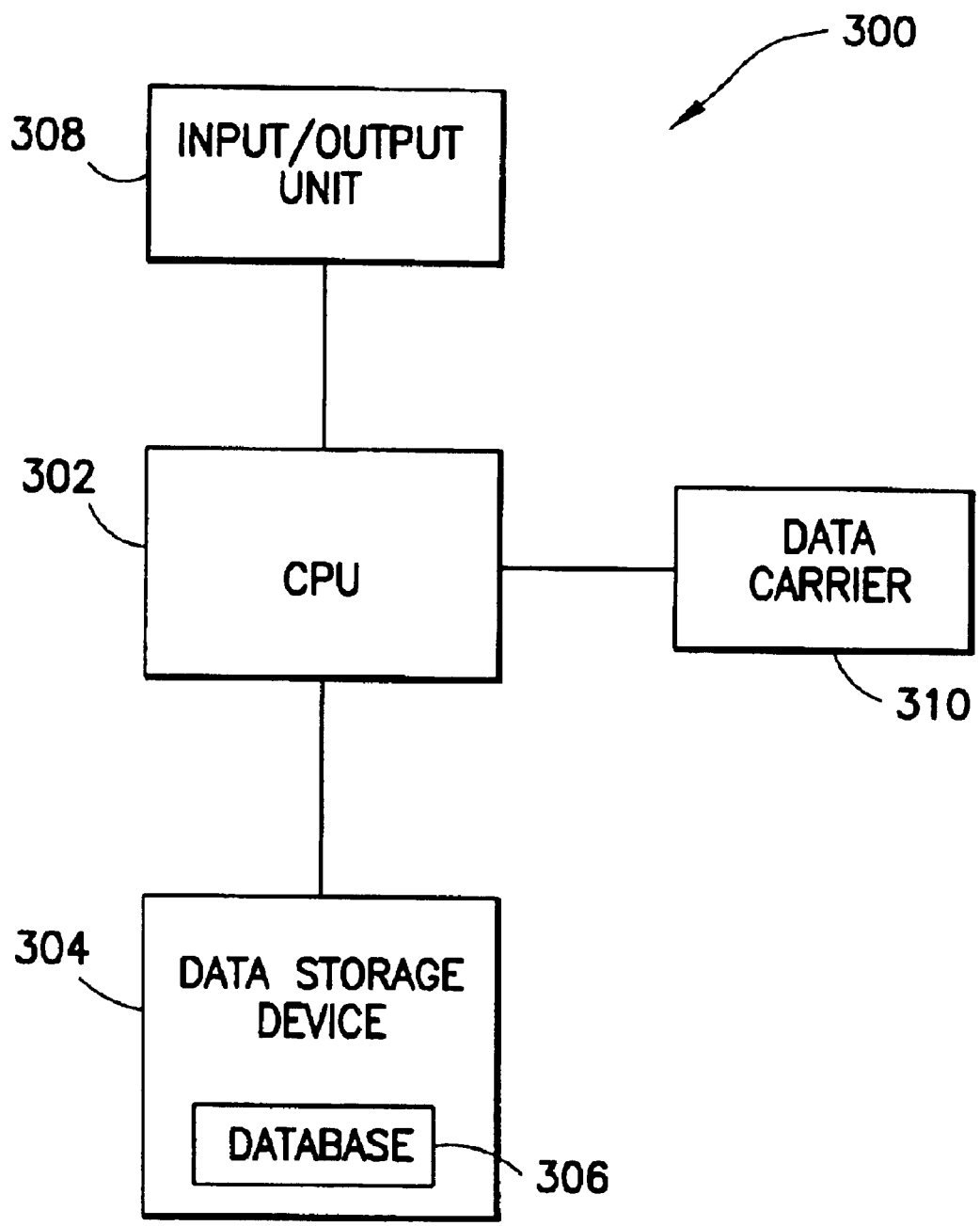
FIG. 8 is a block diagram of a computer system which may be used for practice of the invention.

The device may also be a computer system or the like. A block diagram of a conventional computer system 300, which may be used for the practice of the invention, is shown schematically in FIG. 8. The computer system 300 includes a data processor or a central processing unit (CPU) 302 in electronic communication with a data storage device 304, such as a hard drive optical disk, and the like for maintaining a database 306. Database 306 may at least contain elastic seismic parameter data and anisotropy parameter data. An input/output unit 308 may be connected to the CPU 302 and may be of any conventional type, such as a monitor and keyboard, mouse, touchscreen, printer, and/or voice activated device. The computer system 300 runs a computer program to execute instructions for the CPU 302 to perform any of the methods of the invention described hereinabove. The computer system 300 is simply an example of one suitable computer system for the practice of the invention. Such computer systems are well understood by one of ordinary skill in the art. The computer program may be stored on a data carrier 310, such as a disk electronically connectable with the CPU 302, so as to allow the computer program when run on a computer to execute any of the methods described hereinabove.

Although the present invention has been described in detail in connection with the discussed embodiments, various modifications may be made by one of ordinary skill in the art without departing from the spirit and scope of the present invention. Therefore, the scope of the present invention should be determined by the attached claims.

We claim:

1. A method for anisotropic processing of earth elastic parameter data and application of the processed data, comprising the steps of:
   obtaining earth elastic parameter data of an object of interest;
   obtaining earth anisotropy parameter data of the object of interest;
   transforming the earth elastic parameter data based on input earth anisotropy parameter data to obtain anisotropic elastic parameter data; and
   applying the anisotropic elastic parameter data in at least one method selected from the group consisting of i) an isotropic seismic modeling method, ii) an isotropic seismic analysis and interpretation method, iii) an isotropic seismic wavelet estimation method, iv) an isotropic seismic inversion method, and v) an isotropic method for analysis and interpretation of inversion results to produce processed anisotropic elastic parameter data.

2. The method according to claim 1, comprising the step of substituting the anisotropic elastic parameter data for isotropic elastic parameter data in said isotropic seismic modeling method to produce anisotropic seismic data.

3. The method according to claim 2, further comprising the step of using the produced anisotropic seismic data in an isotropic seismic analysis and interpretation method for analysis and interpretation of anisotropic seismic data.

4. The method according to claim 1, further comprising the step of substituting the anisotropic elastic parameter data for isotropic elastic parameter data in said isotropic seismic analysis and interpretation method for analysis and interpretation of anisotropic seismic data.

5. The method according to claim 1, further comprising the step of substituting the anisotropic elastic parameter data for isotropic elastic parameter data in said isotropic seismic wavelet estimation method for wavelet estimation or to improve an estimate of a wavelet for analysis of anisotropic seismic data.

6. The method according to claim 1, further comprising the step of substituting anisotropic elastic parameter data for isotropic elastic parameter data in said isotropic seismic inversion method to generate estimates of the anisotropic elastic parameter data from anisotropic seismic data.

7. The method according to claim 1, further comprising the step of substituting the anisotropic elastic parameter data for isotropic elastic parameter data in said isotropic method for analysis and interpretation of inversion results.

8. The method according to claim 1, wherein the object of interest is selected from the group consisting of bore hole data, 1-D earth models, 2-D earth models, and 3-D earth models.

9. The method according to claim 1, wherein the step of transforming further comprises applying appropriate transform functions that convert the earth elastic parameter data and earth anisotropy parameter data to the anisotropic elastic parameter data.

10. The method according to claim 9, wherein the transform functions operate on a point-by-point basis.

11. The method according to claim 9, wherein the transform functions are $E'=\epsilon_r^x \delta_r^y \gamma_r^z E$, wherein $\epsilon_r$, $\delta_r$ and $\gamma_r$ are anisotropy relative contrast parameters, $E'$ is an anisotropic elastic parameter, $E$ is the corresponding elastic parameter and x,y,z are constants.

12. The method according to claim 9, wherein the transform functions are derived analytically.

13. The method according to claim 9, wherein transform parameters of the transform functions incorporate spatially varying trends.

14. The method according to claim 9, wherein transform parameters of the transform functions are derived iteratively.

15. The method according to claim 1, wherein the step of transforming elastic parameter data to anisotropic elastic parameter data is obtained by integration of anisotropic elastic parameter contrasts.

16. The method according to claim 15, wherein a low frequency component of the anisotropic elastic parameter data obtained by integration is replaced by a low frequency component from corresponding anisotropic elastic parameter data obtained with transform functions that operate on a point-by-point basis.

17. The method according to claim 1, wherein the anisotropy parameter data are transformed to anisotropy relative contrast parameters such that relative contrasts of the transformed anisotropy parameters approximate the contrasts in the anisotropy parameter data.

18. The method according to claim 17, wherein the transformed anisotropy parameters are normalized to achieve that when the anisotropy is zero the anisotropic elastic parameters equal the elastic parameters from which they are generated.

19. A method for approximating anisotropic seismic modeling by applying isotropic seismic modeling, comprising steps of:
   obtaining earth elastic parameter data of an object of interest;
   obtaining earth anisotropy parameter data of the object of interest;
   transforming the earth elastic parameter data to obtain anisotropic elastic parameter data based on the earth anisotropy parameter data; and
   applying isotropic seismic modeling on the transformed anisotropic elastic parameter data to produce anisotropic seismic data, the produced anisotropic seismic data being an approximation of seismic data obtained by anisotropic seismic molding.

20. The method according to claim 19, further comprising the step of substituting the anisotropic elastic parameter data for isotropic elastic parameter data in isotropic seismic modeling to produce the anisotropic seismic data.

21. The method according to claim 20, further comprising the step of using the produced anisotropic seismic data in an isotropic analysis and interpretation method for analysis and interpretation of the anisotropic seismic data.

22. The method according to claim 19, wherein the object of interest is selected from the group consisting of bore hole data, 1-D earth models, 2-D earth models, and 3-D earth models.

23. The method according to claim 19, wherein the step of transforming further comprises applying appropriate transform functions that convert the earth elastic parameter data and earth anisotropy parameter data to the anisotropic elastic parameter data.

24. The method according to claim 23, wherein the transform functions operate on a point-by-point basis.

25. The method according to claim 23, wherein the transform functions are $E' = \epsilon_r^x \delta_r^y \gamma_r^z E$, wherein $\epsilon_r$, $\delta_r$ and $\gamma_r$ are anisotropy relative contrast parameters, E' is an anisotropic elastic parameter, E is the corresponding elastic parameter and x, y, z are constants.

26. The method according to claim 23, wherein the transform functions are derived analytically.

27. The method according to claim 23, wherein transform parameters of the transform functions incorporate spatially varying trends.

28. The method according to claim 23, wherein transform parameters of the transform functions are derived iteratively.

29. The method according to claim 19, wherein the step of transforming elastic parameter data to anisotropic elastic parameter data is obtained by integration of anisotropic elastic parameter contrasts.

30. The method according to claim 29, wherein a low frequency component of the anisotropic elastic parameter data obtained by integration is replaced by a low frequency component from corresponding anisotropic elastic parameter data obtained with transform functions that operate on a point-by-point basis.

31. The method according to claim 19, wherein the anisotropy parameter data are transformed to anisotropy relative contrast parameters such that relative contrasts of the transformed anisotropy parameters approximate the contrasts in the anisotropy parameter data.

32. The method according to claim 31, wherein the transformed anisotropy parameters are normalized to achieve that when the anisotropy is zero the anisotropic elastic parameters equal the elastic parameters from which they are generated.

33. An iterative method for deriving transform functions to generate anisotropic elastic parameter data, comprising the steps of:
(a) obtaining earth elastic parameter data of an object of interest;
(b) obtaining earth anisotropy parameter data of the object of interest;
(c) generating synthetic anisotropic seismic amplitude reference data using an anisotropic forward modeling method, wherein the modeling method is selected by criteria including type(s) of anisotropy, wave type(s), model complexity and/or modeling accuracy;
(d) generating anisotropic elastic parameter data by applying transforms using an initial set of transform parameters;
(e) applying isotropic forward modeling with the anisotropic elastic parameter data using an isotropic equivalent of the anisotropic forward modeling method used in step (c);
(f) comparing the anisotropic seismic amplitude data synthesized with the isotropic modeling of step (e) with the reference anisotropic seismic amplitude data of step (c);
(g) repeating steps (e) and (f) with at least one modified transform parameter until a satisfactory match is obtained; and
(h) producing the transform functions from the modified transform parameter of step (g).

34. The method according to claim 33, wherein in step (e) equivalence is obtained by setting the anisotropy parameters in the anisotropic forward modeling method to a constant value.

35. The method according to claim 33, wherein in step (e) equivalence is obtained by setting the anisotropy parameters in the anisotropic forward modeling method to zero.

36. The method according to claim 33, wherein the anisotropy parameter data are transformed to anisotropy relative contrast parameters such that relative contrasts of the transformed anisotropy parameters approximate the contrasts in the anisotropy parameter data.

37. The method according to claim 36, wherein the transformed anisotropy parameters are normalized to achieve that when the anisotropy is zero the anisotropic elastic parameters equal the elastic parameters from which they are generated.

38. A device for anisotropic processing of earth elastic parameter data and application of processed data, comprising:
a first input means for inputting earth elastic parameter data of an object of interest;
a second input means for inputting earth anisotropy parameter data of the object of interest;
a transform means for transforming, based on the input earth anisotropy parameter data, the input earth elastic parameter data to obtain anisotropic elastic parameter data;
a processor for applying the anisotropic elastic parameter data in at least one method selected from the group consisting of i) an isotropic seismic modeling method, ii) an isotropic seismic analysis and interpretation method, iii) an isotropic seismic wavelet estimation method, iv) an isotropic seismic inversion method and v) an isotropic method for the analysis and interpretation of inversion results; and
an output means for outputting the processed anisotropic elastic parameter data.

39. A device for approximating anisotropic seismic modeling by applying isotropic seismic modeling, comprising:
a first input means for inputting earth elastic parameter data of an object of interest;
a second input means for inputting earth anisotropy parameter data of the object of interest;
a transform means for transforming, based on the input earth anisotropy parameter data, the input earth elastic parameter data to obtain anisotropic elastic parameter data;
a processor for applying the isotropic seismic modeling on the transformed anisotropic elastic parameter data, the resulting modeled anisotropic seismic data being an approximation of the data obtained by a corresponding anisotropic seismic modeling; and
an output means for outputting the processed anisotropic seismic data.

40. A system including at least one data processor, a storage unit on which at least elastic seismic parameter data and anisotropy parameter data can be stored and a computer program, the computer program comprising instructions for causing the data processor to execute the method steps of claim 1.

41. A system including at least one data processor, a storage unit on which at least elastic seismic parameter data and anisotropy parameter data can be stored and a computer program, the computer program comprising instructions for causing the data processor to execute the method steps of claim 19.

42. A system including at least one data processor, a storage unit on which at least elastic seismic parameter data and anisotropy parameter data can be stored and a computer program, the computer program comprising instructions for causing the data processor to execute the method steps of claim 33.

43. A data carrier on which a computer program is stored, wherein the computer program when run on a computer is able to execute the method steps according to claim 1.

44. A data carrier on which a computer program is stored, wherein the computer when run on a computer is able to execute the method steps according to claim 19.

45. A data carrier on which a computer program is stored, wherein the computer program when run on a computer is able to execute the method steps according to claim 33.

* * * * *

UNITED STATES PATENT AND TRADEMARK OFFICE
CERTIFICATE OF CORRECTION

PATENT NO. : 6,901,333 B2
DATED : May 31, 2005
INVENTOR(S) : Van Riel et al.

It is certified that error appears in the above-identified patent and that said Letters Patent is hereby corrected as shown below:

Title page,
Item [56], References Cited, OTHER PUBLICATIONS,
"H. Rutledal, et al." reference, "as the Oseberg Field" should read -- at the Oseberg Field --.

Column 16,
Line 53, "seismic molding" should read -- seismic modeling --.

Signed and Sealed this

Twentieth Day of December, 2005

JON W. DUDAS
*Director of the United States Patent and Trademark Office*